Patented Oct. 20, 1931

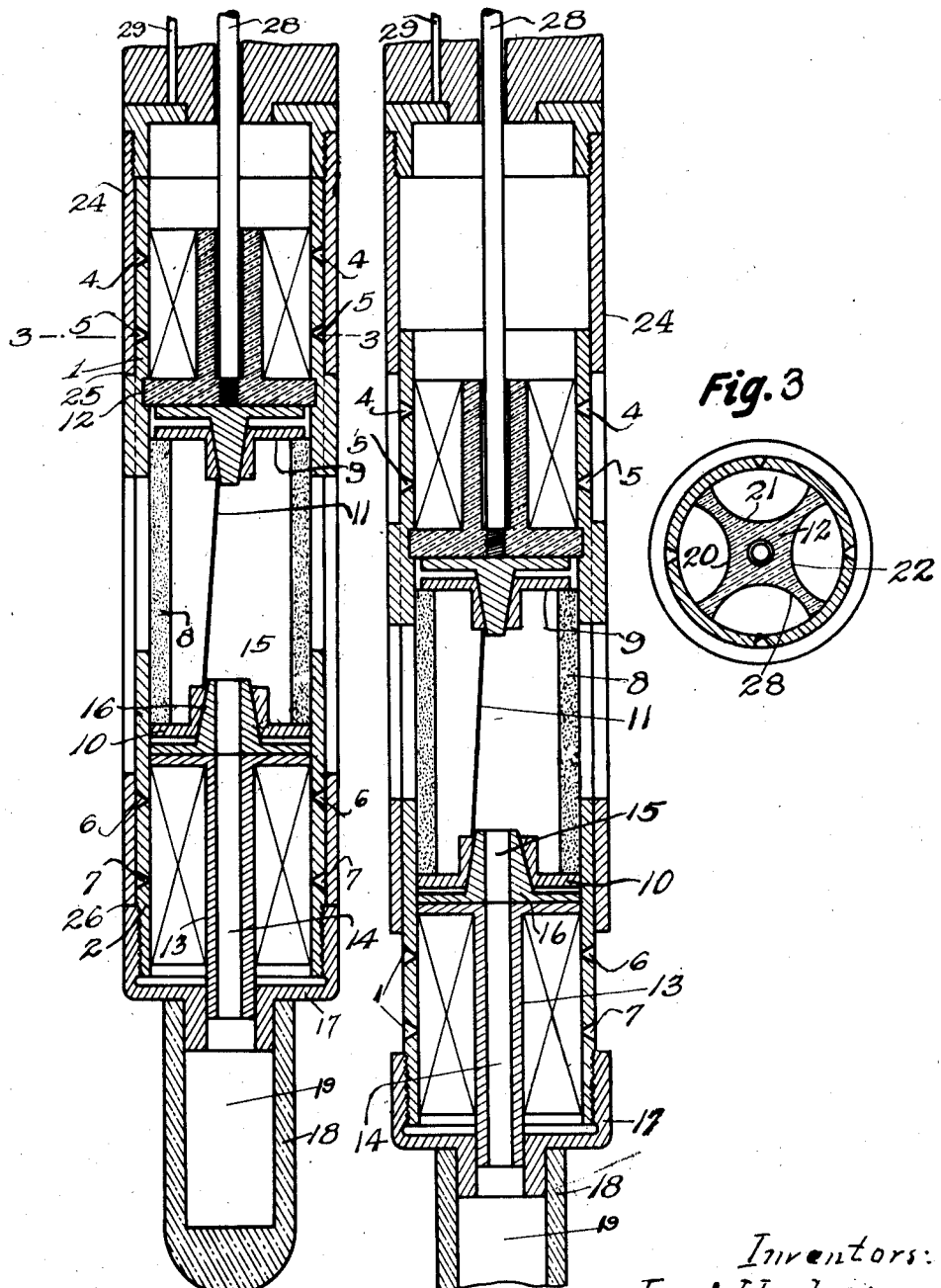

1,828,140

UNITED STATES PATENT OFFICE

JOSEF HEILPERN AND FRANZ GERHARD BACK, OF VIENNA, AUSTRIA, ASSIGNORS, BY MESNE ASSIGNMENTS, TO THE PHOTOR CORPORATION, OF NEW YORK, N. Y., A CORPORATION OF NEW YORK

APPARATUS FOR TAKING PHOTOS OF THE CAVITIES OF THE BODY

Application filed October 25, 1928, Serial No. 315,001, and in Austria April 23, 1928.

The present invention relates to an improvement in apparatus for photographing cavities of the body. We are aware that heretofore apparatus for this purpose has been designed, such apparatus being shown in the following German patents: No. 135,469, Dr. Joachim Schryver, issued November 27, 1902; No. 139,331, W. A. Hirschmann, issued March 19, 1903 and No. 163,216, W. A. Hirschmann, issued September 28, 1905. Such apparatus or devices, however, are unsatisfactory owing to the fact that they are equipped merely with an ordinary electric incandescent lamp, which construction does not permit of the obtaining of satisfactory photographs. The source of light relied upon in the present invention is a wire which is ruptured by a sudden increase of electric current, which power can be derived from a condenser and battery, for instance.

The present invention provides also an apparatus of the general character above indicated in which hole diaphragms are employed in the cameras as distinguished from lenses and cameras are employed not only above but also below the source of light.

The present invention provides also a construction wherein the film is curved when in position in the camera, as distinguished from lying flat, and such construction insures in connection with the hole diaphragms employed desired clearness and definition. In addition the diaphragms and films are so disposed that the entire interior of the cavity can be photographed on the one exposure.

The present invention provides also a construction in which the cameras, of which there are two—one above and the other below a light source—are provided with shutter mechanism, this shutter mechanism being so constructed and arranged that no protruding edges are present when the shutters are in closed position, thereby preventing injury to the cavity to be photograhed upon the insertion of the photographic apparatus therein.

Inasmuch as the present apparatus provides for the taking of a plurality of photographs of a cavity simultaneously, somewhat of a stereoscopic effect is obtained.

We provide also a compensation chamber to compensate or take care of the pressure increase in the apparatus due to the rupturing electrically of the filament employed as the light source.

In the drawings accompanying this application:

Fig. 1 shows in sectional elevation an embodiment of our invention with the shutters in closed position;

Fig. 2 is a view similar to Fig. 1 with the cameras moved to the position they occupy when an exposure is to be made; and Fg. 3 is a section taken substantially on the line 3—3 of Fig. 1.

Referring to the drawings in detail, our improved apparatus comprises an upper camera 1 and lower camera 2. These cameras are both tubular and the camera 1 is provided with two sets of pin hole diaphragms, an upper set 4 and lower set 5. The lower camera 2 is provided with two sets of pin hole diaphragms, an upper set 6 and a lower set 7.

Intermediate the upper and lower cameras is a lighting device consisting of a quartz glass tube 8 provided at its upper end with a cap 9 and at its lower end with a similar cap 10. 11 is a filament within the tube adapted to be burnt through or ruptured by means of a sudden increase of electric current which may be produced by a condenser and battery, not shown. The upper camera 1 is provided with a spider 12 of insulating material and the lower camera is provided with a spider 13. The spider 13 is hollow as shown at 14 and communicates at its upper end with the interior of the lighting device through an opening 15 in a plug 16 which is received by the lower cap 10 above referred to. The lower end of the spider 13 extending through a cap 17 screwed on to the lower end of camera 2 communicates with the interior of a hollow rubber tip 18, the interior of this tip providing a chamber 19 which we have termed a compensating chamber inasmuch as by placing this chamber in communication with the interior of the lighting device the pressure built up in the lighting device is relieved.

The spiders 12 and 13 are each provided with four curved surfaces, illustrated in Fig. 3 and designated 20, 21, 22 and 23, these curved surfaces lying abreast of the pin hole diaphragms. As pointed out above by curving the films instead of having them standing flat, a wider angle can be covered by each diaphragm 5 and a picture of requisite clearness and definition covering a 360° angle can be made on the one exposure.

The shutter mechanism is in the form of a tube 24 surrounding and snugly fitting the cameras and as this shutter mechanism is flush with the exterior of the cameras, as illustrated at 25 and 26 when the shutter mechanism is in closed position, it will be appreciated that the outside of the apparatus presents no protruding edges or surfaces which might be injurious to the walls of the cavity to be photographed.

In operation the apparatus is inserted in the cavity to be photographed with the parts in the position shown in Fig. 1 and thereafter by manipulation of the wire 28 the cameras are moved outwardly of the shutter mechanism in the position shown in Fig. 2, which movement of the cameras uncovers the diaphragms 4, 5, 6 and 7. Current from a suitable source, as a condenser and battery for instance, is then supplied to the wire 11, the current passing through the wire 28, metal plug 27, through the wire or filament, plug 16 and from thence through the metal of the cameras to the wire 29. As above mentioned this current is of sufficient intensity to burn out the wire 11, the burning out or rupturing of this wire providing the illumination. Any pressure which is built up in the lighting device due to the burning out or rupturing of the wire 11 is prevented by the compensating chamber 19, above described.

It will be understood of course that after each operation it is necessary for the lighting device to be renewed due to the fact that the filament thereof has been burnt out or ruptured.

What we claim is:—

1. Apparatus for photographing cavities, comprising a housing a pair of cameras in said housing, a light source in said housing intermediate the said cameras, and each of said cameras being provided with hole diaphragms.

2. Apparatus for photographing cavities, comprising a housing a pair of cameras in said housing, a light source intermediate the said cameras, said cameras being provided with hole diaphragms and said light source with a filament adapted to be burnt out or ruptured electrically.

3. Apparatus for photographing body cavities, comprising a pair of tubular cameras, a lighting device intermediate the same, each of said cameras being provided with an upper and a lower set of circumferentially arranged equidistantly spaced diaphragms.

4. Apparatus for photographing body cavities, comprising spaced cameras, and an intermediate lighting device provided with a transparent shell.

5. Apparatus for photographing body cavities, comprising a camera, a light source therefor, and a hollow tip, the interior of which provides a compensating chamber communicating with the interior of the lighting device.

6. A tubular structure for introduction into cavities of the body to photograph said cavities, comprising in combination upper and lower cameras each provided with hole diaphragms, and an intermediate light source serving both cameras.

7. A structure for introduction into body cavities to photograph the same and comprising in combination a camera having hole diaphragms through the walls thereof; a light source therefor and a film support lying abreast of each diaphragm and concaved on the face abreast of the diaphragm.

8. A structure for introduction into body cavities to photograph the same and comprising in combination a tubular camera having hole diaphragms through the wall thereof and circumferentially disposed, and a circumferentially disposed concave film supporting surface lying abreast of and facing said diaphragms.

9. A structure for introduction into body cavities to photograph the same comprising in combination upper and lower tubular cameras each having circumferentially disposed hole diaphragms through their walls, an intermediate tubular lighting structure, and a shutter for said diaphragms surrounding said cameras and lighting structure flush with the exterior of the apparatus.

10. A device of the class described comprising in combination a housing, a pair of cameras in said housing, a light source in said housing intermediate said cameras, and a conductor for carrying current to one terminal of said light source, the other terminal being grounded on said housing.

11. A device of the class described comprising in combination a camera provided with a plurality of sets of film supports disposed one above the other, a light source for the camera in the form of a filament mounted adjacent the camera, and means for carrying current to said filament whereby the same will be burnt out or ruptured electrically.

12. A structure for introduction into the body cavities to photograph the same comprising in combination a camera provided with a plurality of sets of film supports, circumferentially arranged, and disposed one above the other and a diaphragm abreast of each film support.

13. Photographic apparatus adapted to be introduced into body cavities to photograph the same comprising in combination a plurality of cameras disposed one above the other, each camera being provided with a plurality of sets of film supports circumferentially disposed and a hole diaphragm abreast of each film support.

14. A photographic structure for introduction into body cavities comprising in combination a pair of cameras disposed one above the other, an electrically operated light source disposed intermediate said cameras, and a housing for said cameras and light source, the walls of said housing acting as a conductor for the current for the said light source.

15. A device of the class described comprising in combination a pair of cameras disposed one above the other, a light source intermediate said cameras, a tubular housing for said cameras and light source, said light source comprising a filament adapted to be ruptured by current passed therethrough, means for securing said filament in said housing, means for conducting current to one terminal of said filament, the other terminal of the filament being grounded on the said housing.

16. A device of the class described comprising in combination a tubular housing, a pair of cameras in said housing, a light source in said housing intermediate said camera and comprising a filament adapted to be ruptured upon the application of electrical current thereto.

In testimony whereof we affix our signatures.

Dr. JOSEF HEILPERN.
Ing. FRANZ GERHARD BACK.